R. Johnson,
Door and Sash Securer.
No. 1,624. Reissued Feb. 23, 1864.
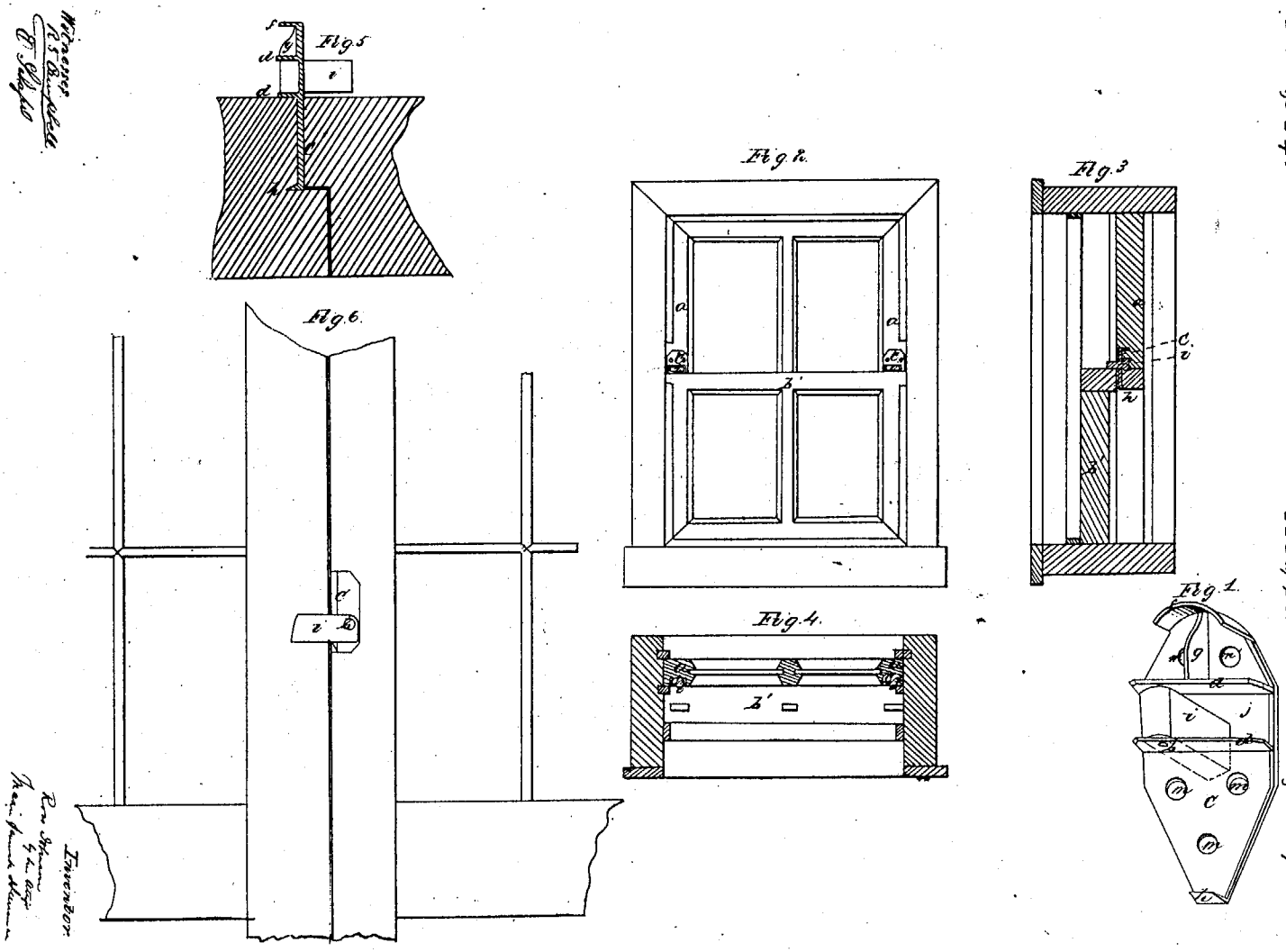
Witnesses
R. S. Campbell
O. Schofield
Inventor
Ros Johnson
by his atty
Marcus Lawrence Sherman
N. PETERS, PHOTO-LITHOGRAPHER, WASHINGTON, D. C.

UNITED STATES PATENT OFFICE.

ROSS JOHNSON, OF FREDERICK, MARYLAND.

IMPROVEMENT IN SASH AND DOOR FASTENINGS.

Specification forming part of Letters Patent No. 28,491, dated May 29, 1860; Reissue No. 1,624, dated February 23, 1864.

*To all whom it may concern:*

Be it known that I, ROSS JOHNSON, of the city and county of Frederick, and State of Maryland, have invented a new and useful Improvement in Portable Door and Window-Sash Fasteners; and I do hereby declare that the following is a full, clear, and exact description of the same, reference being had to the accompanying drawings, forming a part of this specification, in which—

Figure 1 represents a perspective view of my portable door and window-sash fastener. Fig. 2 is a front view of a window with my device applied thereto when used as a permanent sash-fastener. Figs. 3 and 4 represent sections of Fig. 2, and Fig. 5 represents a section of my device when applied as a door-fastener.

Similar letters indicate corresponding parts in the several figures.

To enable others skilled in the art to make and use my invention, I will proceed to describe its construction and operation.

The plate C is perforated, as at *j*, the dimensions of the perforations being equal to the size of bolt *i*, which, when shut, will just fill the perforation. This bolt is pivoted, as at *b*, to the flanges *d*, which project from the upper and lower edges of the perforation at right angles to the plate C, as indicated. The pivot *b*, as shown in the drawings, is placed not quite at one end of the bolt, so that by pressing in the short end of the bolt it will turn on its pivot and throw out its longer end, as seen in Fig. 1; but the bolt may be pivoted centrally of its length and still perform its appropriate function. The upper flange *d* is braced by means of a rib, *g*, and the upper end of the plate has a projection, *f*, to hold the instrument by when adjusting it to a door or window. The projection *f*, however, is not indispensable for this purpose, as the rib *g* may be used instead.

When the implement is to be used as a permanent sash-fastener, the plate C is also provided with a number of screw-holes, *m*. When using the instrument as a door-fastener, the under portion of plate C, with the hook *h*, is placed against the side of the door-frame, the lower flange *d* being even with the inside front of the door-frame. The door is then closed so as to press the hook *h* into the door-frame, and thus fasten the instrument in position in such manner that it cannot be removed except upon opening the door.

My device will answer as a portable window-fastener if it is placed between the two sashes in the same manner as it is placed between a door and its frame.

To use the instrument as a permanent window-fastener, it must be placed at the lower side edge of the upper sash, *a*, (see Figs. 2 and 3,) which has previously been provided with a suitable recess for the plate with its flanges, rib, projection *f*, and hook *h* to fit in, the whole of which parts are made of metal, and may be cast in one piece. It is then fastened by screws inserted through holes *m* provided for this purpose. The outer surface of the plate is then even with the surface of the sash-frame, so as not to interfere with the raising or lowering of the lower sash, *b'*.

When it is desired to close and fasten the sashes, the sash *b* is lowered, as seen at Fig. 2, and the short end of the bolt *i* is pressed in, so as to throw out the long end of the bolt across the upper surface of the frame *b'*, as seen in Fig. 3, thus locking the sash in a very effectual manner. In this manner the mode of fastening cannot be detected from without, as the whole of the device, with the exception of the bolt end, is hidden, and even this cannot be seen from the outside of the window.

What I claim as new, and desire to secure by Letters Patent, is—

The within described implement C *j i*, as a door and window sash fastener, substantially as set forth.

Witness my hand in matter of my application for reissue of my patent for improvement in door and sash fasteners.

ROSS JOHNSON.

Witnesses:

R. T. CAMPBELL,

E. SCHAFER.